United States Patent [19]
Yamaguchi et al.

[11] Patent Number: 5,897,157
[45] Date of Patent: Apr. 27, 1999

[54] ASSEMBLY STRUCTURE OF AN AUTOMOTIVE DOOR HARNESS

[75] Inventors: Noboru Yamaguchi; Yasuyoshi Serizawa, both of Shizuoka, Japan

[73] Assignee: Yazaki Corporation, Tokyo, Japan

[21] Appl. No.: 08/886,894

[22] Filed: Jul. 2, 1997

[30] Foreign Application Priority Data

Jul. 5, 1996 [JP] Japan .................................. 8-176687

[51] Int. Cl.⁶ ......................................................... B60J 5/04
[52] U.S. Cl. ......................................................... 296/146.7
[58] Field of Search ............................... 296/152, 146.7, 296/146.12

[56] References Cited

U.S. PATENT DOCUMENTS

| | | | |
|---|---|---|---|
| 4,653,799 | 3/1987 | Arai et al. | 296/146.12 |
| 4,862,011 | 8/1989 | Wright | 296/152 |
| 5,716,044 | 2/1998 | Peterson et al. | 296/152 |

FOREIGN PATENT DOCUMENTS

| | | |
|---|---|---|
| 58-113566 | 8/1983 | Japan . |
| 8-33166 | 2/1996 | Japan . |

*Primary Examiner*—Gary C. Hoge
*Attorney, Agent, or Firm*—Armstrong, Westerman, Hattori, McLeland & Naughton

[57] ABSTRACT

The car body-side connector is installed on the inner or passenger compartment side of the weather strip of the car body. The wiring harness having the door-side connector coupled to the mating connector is inserted through the rigid protector. The door-side connector is attached to one end of the protector, whose other end slidably engages with the slide guide mounted on the door panel of the car door. The car body-side connector is rotatable. The slide guide is formed with a longitudinal guide slot that slidably receives a projection of the protector. It is also possible to form a raised guide rail on the slide guide and provide the protector with a groove for receiving the guide rail.

14 Claims, 6 Drawing Sheets

F I G. 1
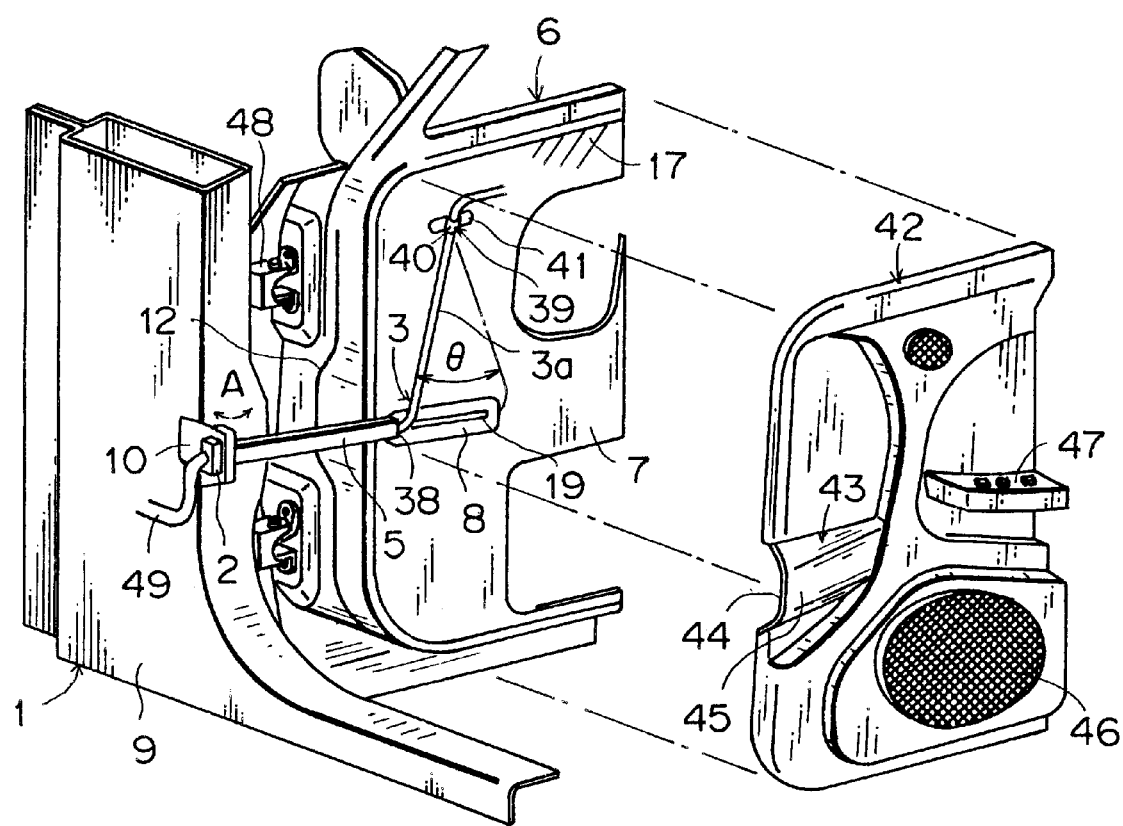

ASSEMBLY STRUCTURE OF AN AUTOMOTIVE DOOR HARNESS

BACKGROUND OF THE INVENTION

1. Field of the Invention

The present invention relates to an assembly structure of an automotive door harness that enhances the ease of assembly work by eliminating the processes of inserting wiring harnesses through piercing holes in the door panel and car body and assembling waterproofing grommets.

2. Description of the Related Art

FIG. 8 shows an assembly structure of an automotive door harness described in Japanese Patent Application Laid-Open Specification No. Heisei 8-33166.

This structure has a recessed groove 63 at a front end face 62 of a door panel 61 on the hinge mounting side extending in a direction of door thickness. In this recessed groove 63 is laid a wiring harness 64, over which is slid and fitted a base plate portion 66 of a rubber grommet 65, with a front end portion 64a of the wiring harness inserted through a bellows portion 67 of the grommet 65 so that the wiring harness can be led toward the car body side.

The above structure, however, requires troublesome processes of inserting the wiring harness 64 through a hole 68 of the grommet 65 and putting the front end of the bellows portion 67 in place on the car body side. Moreover, the structure of the grommet 65 and the forming process of the door panel 61 are complex and the sealing performance of the weather strip 69 overlying the base plate portion 66 of the grommet 65 must be secured.

FIG. 9 and 10 show an assembly structure of the automotive door harness described in Japanese Patent Application Laid-Open Specification No. Showa 58-113566.

In this structure, both a door panel 71 and a car body 72 are formed with piercing holes 73, 74, through which is passed a cylindrical elastic protector 75 made of rubber having a wiring harness 76 inserted therethrough, with one end of the elastic protector 75 secured to the car body with a clamp 77 and the other end extending unfixed along the door panel 71. A core material 78 is inserted in a part of the protector 75 on the door side to give it a certain rigidity so that when a door 80 is opened about a hinge 79 as shown in FIG. 10, the protector 75 slides in the piercing hole 73 and bends at an intermediate portion to follow the movement of the door 80.

This structure, however, requires a cumbersome assembly work of inserting the protector 75 through the piercing holes 73, 74 with the door 80 open. The installation of the wiring harness 76 is not easy particularly because the protector 75 on the door side does not bend. Because this structure requires large piercing holes 73, 74, the sealing performance of the grommets 81, may deteriorate. Further, because one end of the protector 75 is not fixed, the protector 75 may interfere with and score the door 8 during the opening and closing of the door.

SUMMARY OF THE INVENTION

Under these circumstances, it is an object of the present invention to provide an assembly structure of automotive door harness that eliminates cumbersome processes of inserting wiring harnesses through piercing holes in the car body and door panel or through grommets; which still maintains the capability of waterproofing the door harness without using grommets; and which does not score the door with the protector when the door is opened or closed.

In order to attain the object, according to this invention, there is provided an assembly structure of an automotive door harness comprising: a car body; a door; a door-side wiring harness having a first connector couplable to a second connector; and a rigid protector sleeved over the door-side wiring harness, wherein the second connector is arranged on a passenger compartment side of a weather strip on the car body, wherein the protector has the first connector attached at one end thereof, and wherein the protector is slidably held on the door.

Preferably, a slide guide is provided on a door panel of the door which is covered with a door trim, and the protector is at the other end slidably engaged with the slide guide.

Preferably, the second connector is arranged so as to be horizontally rotatable.

Preferably, the slide guide has a longitudinally extending guide slot and the other end of the protector is provided with a projection for sliding engagement with the guide slot.

Preferably, the slide guide has a longitudinally extending, raised guide rail and the protector is provided with a corresponding groove for sliding engagement with the guide rail.

Preferably, the second connector is mounted on an inner wall of the car body via a bracket.

Preferably, the protector comprises a protector body substantially U-shaped in cross section and a cover separatably fitted to an open lateral side of the protector body, each having at a respective front end an enlarged portion for accommodating therein the first connector.

Preferably, the projection is provided on the cover.

Preferably, the projection has a mushroom-like shape.

Preferably, the guide rail comprises a support portion and a bulged head portion at a free end of the support portion.

Preferably, the protector has at a side opposed to the guide rail a wall which defines the groove, the groove comprising a bulged portion for receiving the head portion of the guide rail and a narrow opening for receiving the support portion.

Preferably, the door panel is lined with a waterproof sheet and the slide guide is mounted on the door panel with the waterproof sheet interposed therebetween.

Preferably, the wiring harness led out from the other end of the protector is fixed by a clamp at a position upward and rearward of the other end of the protector.

Preferably, the door trim is provided with a bulged protector accommodating portion.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is an exploded, perspective view of an assembly structure of an automotive door harness as one embodiment of this invention;

DESCRIPTION OF THE PREFERRED EMBODIMENTS

Figure 2:
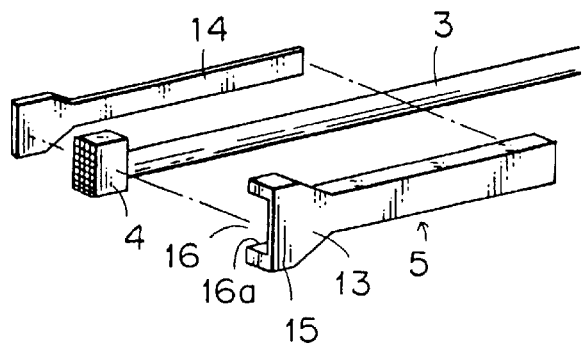
FIG. 2 is an exploded perspective view of a harness protector.

An embodiment of the present invention will be described in detail by referring to the accompanying drawings.

FIG. 1 shows an example embodiment of an automotive door harness assembly structure of this invention.

This structure has a connector 2 of a car body-side wiring harness 49 installed rotatable on the car body 1. A door inner panel (door panel) 7 of the door 6 is provided with a horizontal slide guide 8. A straight, rigid protector 5 of synthetic resin is sleeved over a door-side wiring harness 3 and has a connector 4 of the door-side wiring harness 3 (see FIG. 2) fitted at one end thereof and has the other end slidably fitted in the slide guide 8. The door-side connector 4 is connected to the car body-side connector 2.

The car body-side connector 2 is mounted on a bracket 10 secured to an inner wall 9 of the car body 1 so that the connector 2 can be rotated in the direction of arrow A. The car body-side connector 2 and the door-side connector 4 are coupled together on the inner side of a car body-side weather strip 11 (see FIG. 7). This eliminates the need for a conventionally used waterproofing grommet. In FIG. 1, denoted 12 is a weather strip on the door side.

The protector 5 can be separated into two parts, a protector body 13 and a cover 14, as shown in FIG. 2. The protector body 13 is roughly U-shaped in cross section and has at the front end portion an enlarged portion 15 that engages the rear end portion of the connector 4. The protector body 13 can accommodate the door-side wiring harness 3 in its longitudinal groove 16. The cover 14 is formed like a plate and fits in an opening 16a of the groove 16 of the protector body 13. The wiring harness 3 is held straight by a rigid protector 5 that prevents the wiring harness from being bent.

In FIG. 1, the slide guide 8 is secured horizontally almost at the center, in the direction of height, of the door inner panel 7. The surface of the door inner panel 7 is lined with a waterproof sheet 17 of synthetic resin. The slide guide 8 is mounted on the door inner panel 7 with the waterproof sheet 17 interposed between.

Figure 3:
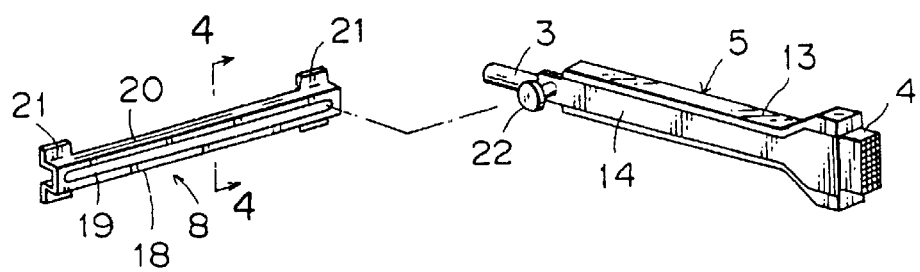
FIG. 3 is an exploded perspective view showing a slide mechanism of the protector.
Figure 4:
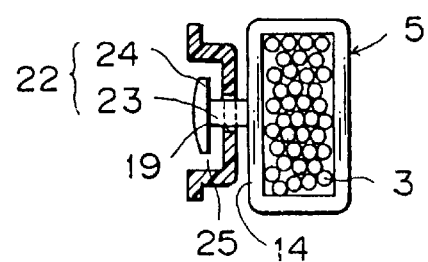
FIG. 4 is a cross section taken along the line A—A of FIG. 3 showing the assembled state of the slide mechanism.

FIG. 3 and 4 show an example of the slide mechanism of the protector. The slide guide 8 is roughly U-shaped in cross section and has a horizontally extending guide slot 19 formed at the center of a guide base plate 18 thereof. The guide base plate 18 has two pairs of fixing plates 21 formed integrally with side walls 20 at the front and rear ends. The fixing plates 21 are secured to the door inner panel 7 by bolts or clips (not shown).

The cover 14 of the protector 5 has a mushroom-like projection 22 formed at the rear end thereof for slidable engagement with the guide slot 19. The projection 22 consists of a cylindrical shank 23 and a disklike head 24. The shank 23 passes through the guide slot 19, with the head 24 loosely received in a space or groove 25 enclosed by the guide base plate 18 and the side walls 20 of the slide guide 8. The projection 22 is secured to the protector 5 by inserting the shank 23 into the guide slot 19 from the back of the slide guide 8 and securely screwing it into the cover 14. The protector 5 has the wiring harness 3 passing therethrough.

In FIG. 3, it is also possible to form the slide guide 8 on the protector 5 and fix the projection 22 for engagement with the slide guide 8 to the door inner panel 7 of the door 6 (FIG. 1). The slide guide 8 may also be provided to the door trim 42, rather than to the door inner panel 7. (This is proposed in a separate application.)

Figure 5:
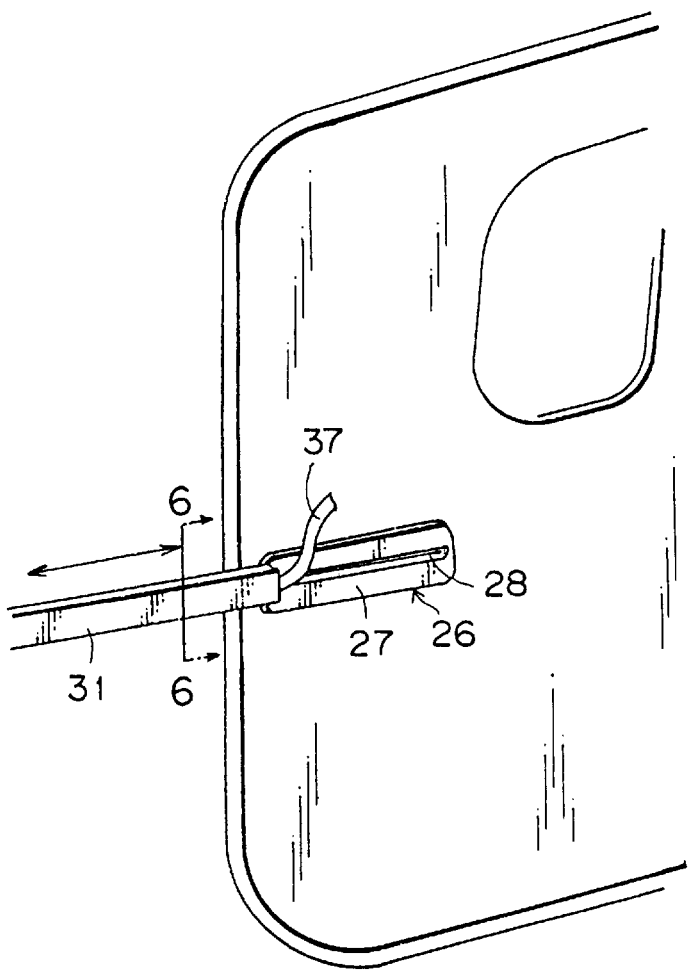
FIG. 5 is an exploded perspective view of another example of the slide mechanism of the protector.
Figure 6:
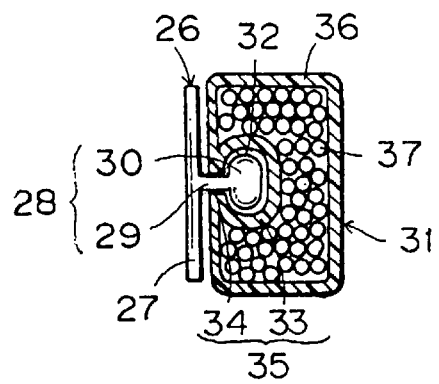
FIG. 6 is a cross section taken along the line B—B of FIG. 5.

FIG. 5 and 6 show another embodiment of the slide mechanism for the protector.

The slide guide 26 of this embodiment has a horizontal guide rail 28 protruding at the center of the base plate portion 27. The guide rail 28 has a bulged head portion 30 at the end of a support portion 29. The protector 31 is formed with a longitudinally extending groove 32 that receives the guide rail 28. The groove 32 is defined by a groove wall 35, which consists of a bulged portion 33 for receiving the head portion 30 and a narrow opening 34 for receiving the support portion 29. It is preferred that the head portion 30 and the groove 32 be kept in a loosely coupled condition so that their oscillation during the door opening and closing can be absorbed. The groove wall 35 is situated inside the protector 31. A wiring harness 37 is inserted between the groove wall 35 and the protector circumferential wall 36.

Figure 7:
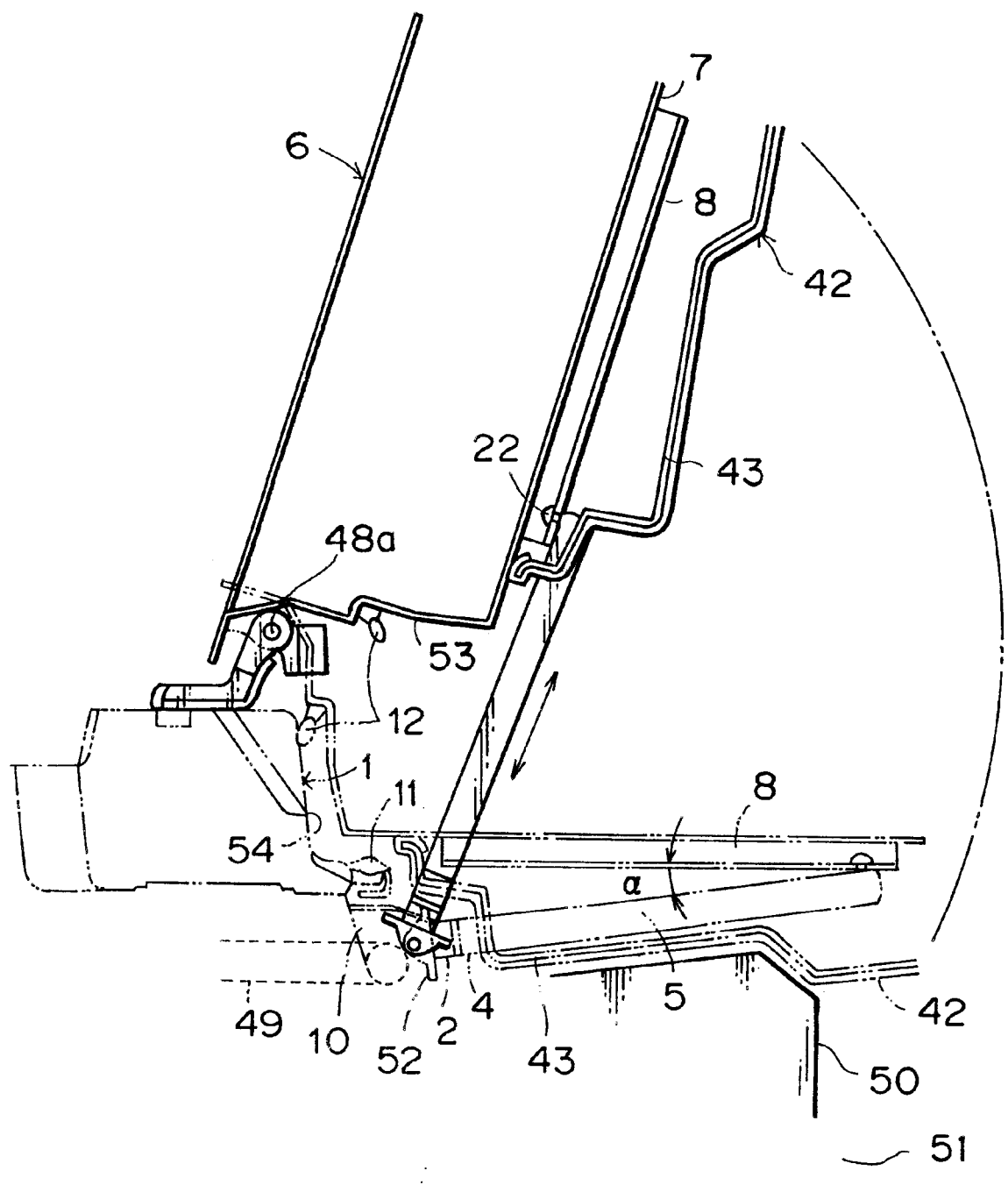
FIG. 7 is a plan view showing the motion of the protector when the door is opened and closed.
Figure 8:
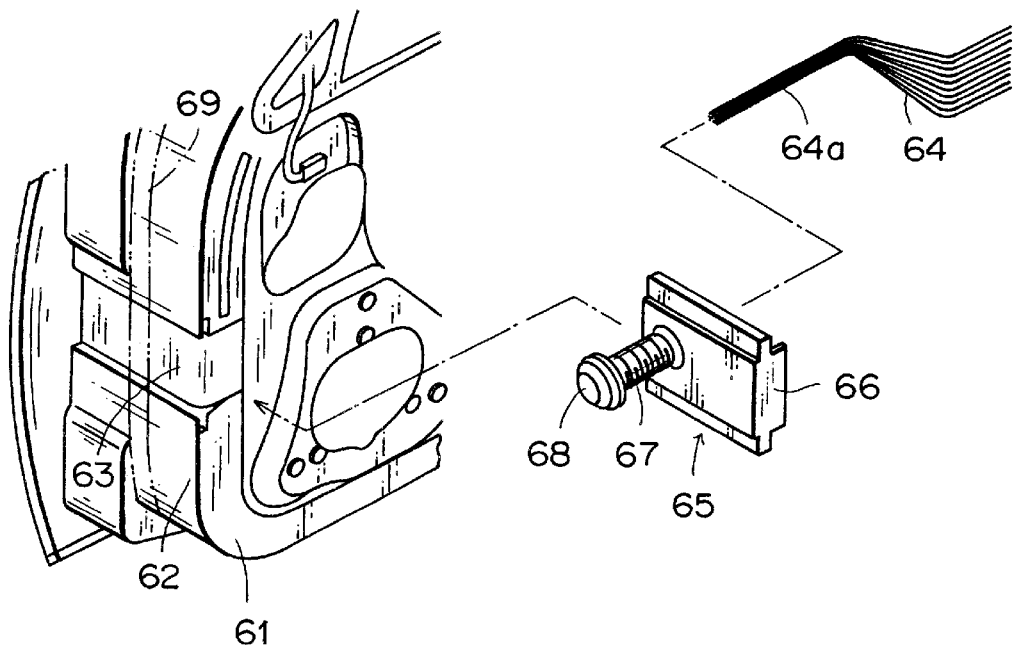
FIG. 8 is an exploded perspective view of a conventional door harness assembly structure.
Figure 9:
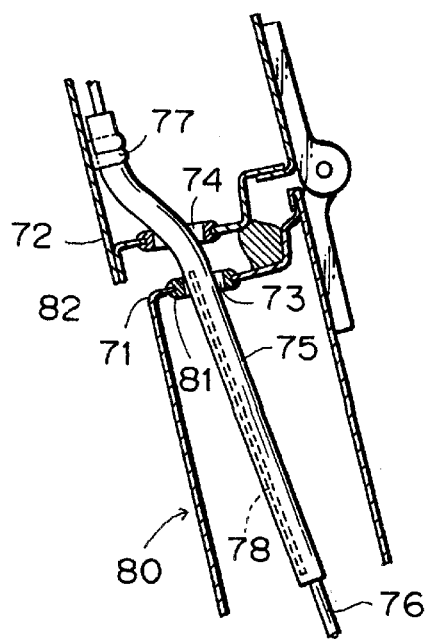
FIG. 9 is a plan view showing the conventional door harness assembly structure when the door is closed.
Figure 10:
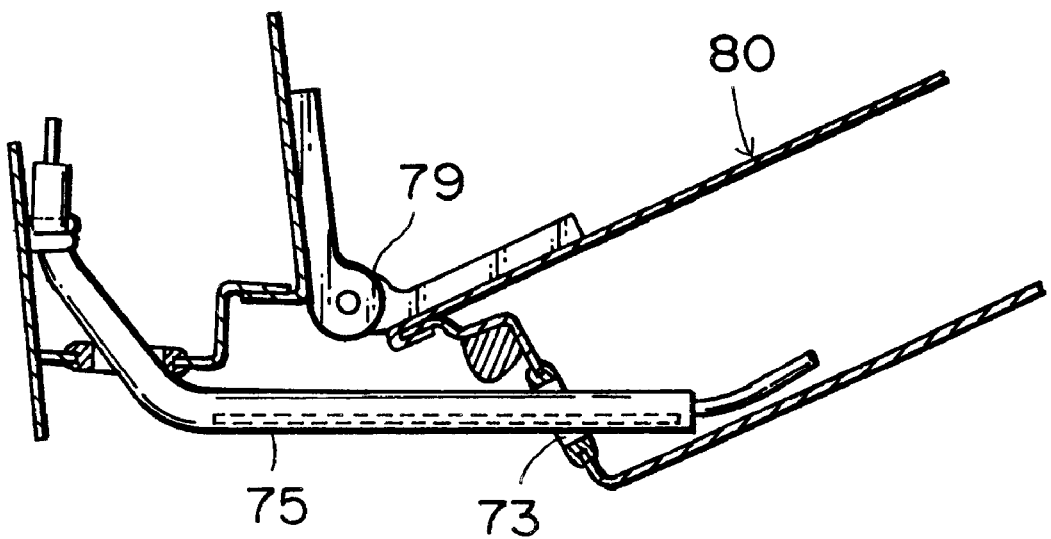
FIG. 10 is a plan view of the same when the door is open.

The embodiment shown in FIG. 5 and 6 is suited for a case where the angled α between the protector 5 and the slide guide 8 of FIG. 7 does not change greatly between the open state and the closed state of the door. It is also possible to form the groove 32 only at the rear end portion of the protector 31 to deal with the change in the angle α.

In FIG. 1, the wiring harness 3 is led out from an opening 38 at the rear end of the protector 5 and is drawn upwardly and slightly rearwardly to an upper part of the door inner panel 7, where it is fixed by a clamp 39. The clamp 39 consists of a curved retaining portion 40 through which the wiring harness 3 is passed, and a pair of fixing portions 41 protruding from the sides of the retaining portion 40. The fixing portions 41 are secured horizontally to the door inner panel 7 by bolts not shown. The wiring harness 3 is led rearwardly from the clamp 39 to connect to auxiliary devices and connectors, not shown, in the door 6.

As the door 6 is opened or closed and the protector 5 slides horizontally along the slide guide 8, the inclined portion 3a of the wiring harness 3 oscillates about the retaining portion 41 of the clamp 39 as a pivoting center through the angle θ along the surface of the door inner panel 7.

In FIG. 1, the door inner panel 7 is covered with a door trim 42 of synthetic resin. The door trim 42 is formed with a bulged protector accommodating portion 43 that faces the slide guide 8. The protector 5 is accommodated between the door inner panel 7 and the door trim 42 when the door is closed.

The protector accommodating portion 43 is tapered outwardly toward the front end of the door trim that has an opening 44 into which to insert the protector. The tapered wall 45 of the protector accommodating portion 43 allows the protector 5 to be oscillated smoothly about the connector 2 without interference with the door trim 42 when the door is opened or closed. This is because the angle α made between the slide guide 8 and the protector 5 when the door 6 is opened differs from the angle formed when the door is closed. Because the protector 5 slides along the slide guide 8, the rear end side of the protector accommodating portion 43 can be formed thinner.

In FIG. 1, the door trim 42 is provided with a speaker 46 and a switch unit 47 for an arm rest not shown. Designated 48 is a door hinge and 49 a car body-side wiring harness.

In FIG. 7, reference number 7 represents a door inner panel, 1 a car body, 48a a hinge fulcrum, 10 a connector fixing bracket, 50 an instrument panel, and 51 a passenger compartment. The door harness 3 is not shown.

The protector 5 has a mushroom-like projection 22 at the rear end which engages with the slide guide 8. The projection 22 is situated at the rear end of the slide guide 8 when the door is closed. The door-side connector 4 at the front end of the protector is connected to the mating rotatable connector 2 that can be rotated by a rotating mechanism 52.

When the door 6 is opened, the protector oscillates with the door 6 causing the projection 22 to move inside the slide guide 8 to the front end of the slide guide 8. The mating connector 2 is rotated by the rotating mechanism 52 as the protector 5 oscillates.

At almost the center of the front end face 53 of the door 6 on the hinge mounting side there is provided a weather strip 12, which, when the door is closed, engages an outer side area of that circumferential wall surface 54 of the car body 1 which opposes the front end face 53 of the door 6. There is another weather strip 11 at an inner side area of the circumferential wall surface 54. The connectors 2, 4 are located on the inner side (passenger compartment side) of the weather strip 11, as described earlier. Hence, the connectors 2, 4 do not require waterproofing means. The car body-side wiring harness 49 led from the rotatable connector 2 is laid along the car body 1. The mating connector 2 can be arranged at an appropriate vertical position of the car body to avoid interference with the instrument panel.

The advantages of this invention may be summarized as follows.

Because the door harness is installed inside the seal portion (weather strip) of the car body, there is no need for the conventionally used waterproofing grommets, eliminating cumbersome processes of inserting the wiring harness through the grommets, reducing the parts cost, and improving the ease of wiring harness assembly work. At the same time, because the work of inserting the wiring harness through piercing holes in the door and the car body is obviated, the number of steps for installing the wiring harness is reduced. Further, because it is not necessary to make holes in the door and car body, there is no need to install blind plugs in less expensive cars that use no door harnesses. In another aspect of this invention, because the rear end of the protector slides along the slide guide, the harness is prevented from contacting the door panel with strong force and scoring the door. Further, because the protector is guided along the slide guide, it is possible to make thinner the wiring harness accommodating portion on the rear side of the door trim. Furthermore, the harness path in the door can be kept in a restricted area, which in turn keeps the door harness from interfering with other auxiliary devices.

Having now fully described the invention, it will be apparent to one of ordinary skill in the art that many changes and modifications can be made thereto without departing from the spirit and scope of the invention as set forth herein.

What is claimed is:

1. An assembly structure of an automotive door harness comprising:
   a car body;
   a door;
   a door-side wiring harness having a first connector couplable to a second connector; and
   a rigid protector sleeved over said door-side wiring harness,
   wherein said second connector is arranged on a passenger compartment side of a weather strip on said car body,
   wherein said protector has said first connector attached at one end thereof, and
   wherein said protector is slidably held on said door.

2. An assembly structure of an automotive door harness according to claim 1, wherein a slide guide is provided on a door panel of said door which is covered with a door trim, and said protector is at the other end slidably engaged with said slide guide.

3. An assembly structure of an automotive door harness according to claim 1 or 2, wherein said second connector is arranged so as to be horizontally rotatable.

4. An assembly structure of an automotive door harness according to claim 2, wherein said slide guide has a longitudinally extending guide slot and said the other end of the protector is provided with a projection for sliding engagement in said guide slot.

5. An assembly structure of an automotive door harness according to claim 2, wherein said slide guide has a longitudinally extending, raised guide rail and said protector is provided with a corresponding groove for sliding engagement with said guide rail.

6. An assembly structure of an automotive door harness according to claim 3, wherein said second connector is mounted on an inner wall of said car body via a bracket.

7. An assembly structure of an automotive door harness according to claim 4, wherein said protector comprises a protector body substantially U-shaped in cross section and a cover separatably fitted to an open lateral side of said protector body, each having at a respective front end an enlarged portion for accommodating therein said first connector.

8. An assembly structure of an automotive door harness according to claim 7, wherein said projection is provided on said cover.

9. An assembly structure of an automotive door harness according to claim 8, wherein said projection has a mushroom-like shape.

10. An assembly structure of an automotive door harness according to claim 5, wherein said guide rail comprises a support portion and a bulged head portion at a free end of said support portion.

11. An assembly structure of an automotive door harness according to claim 10, wherein said protector has at a side opposed to said guide rail a wall which defines said groove, said groove comprising a bulged portion for receiving said head portion of the guide rail and a narrow opening for receiving said support portion.

12. An assembly structure of an automotive door harness according to claim 2, wherein said door panel is lined with a waterproof sheet and said slide guide is mounted on said door panel with said waterproof sheet interposed therebetween.

13. An assembly structure of an automotive door harness according to claim 2, wherein said wiring harness led out from said the other end of the protector is fixed by a clamp at a position upward and rearward of said the other end of the protector.

14. An assembly structure of an automotive door harness according to claim 2, wherein said door trim is provided with a bulged protector accommodating portion.

* * * * *